United States Patent [19]

Tarbell

[11] Patent Number: 4,669,944
[45] Date of Patent: Jun. 2, 1987

[54] WHEELED TRUCK

[76] Inventor: Robert J. Tarbell, 358 Bedford Ave., Buffalo, N.Y. 14216

[21] Appl. No.: 781,714

[22] Filed: Sep. 30, 1985

[51] Int. Cl.4 .............................................. B60P 1/04
[52] U.S. Cl. ................................ 414/476; 280/43.24; 414/480; 414/537
[58] Field of Search ............... 414/469, 474, 476, 480, 414/537, 538; 296/14, 32; 280/43.24

[56] References Cited

U.S. PATENT DOCUMENTS

| | | | |
|---|---|---|---|
| 1,562,750 | 11/1925 | Floyd | 280/43.24 X |
| 1,789,391 | 1/1931 | De Forest Roe | 414/469 X |
| 2,446,518 | 8/1948 | Arnold et al. | 280/43.24 |
| 2,572,945 | 10/1951 | Quesnoit | 414/480 |
| 2,676,054 | 4/1954 | Pasin | 296/32 |
| 2,733,823 | 2/1956 | Evans | 414/476 |
| 2,814,498 | 11/1957 | Hull | 280/43.24 |
| 2,984,514 | 5/1961 | Lemley | 296/14 |
| 3,233,767 | 2/1966 | Goodacre | 414/537 X |
| 3,548,433 | 12/1970 | Miles et al. | 414/476 X |
| 3,782,569 | 1/1974 | Montgomery | 414/476 |

*Primary Examiner*—Frank E. Werner
*Assistant Examiner*—David A. Bucci
*Attorney, Agent, or Firm*—Christel, Bean & Linihan

[57] ABSTRACT

A wheeled truck including a platform defining a planar support surface having first and second opposite ends, two wheels attached to the platform at the first end thereof and two wheels attached to the platform at the second end thereof utilizes hinges for hingedly securing the two wheels located at the second end to the platform and a lever member for raising and lowering the second support surface end to thereby facilitate the loading and unloading of the truck. The hingedly-secured wheels are each pivotally movable relative to the platform between an operative condition at which the hingedly-secured wheels operatively support the second support surface end in an elevated condition for transporting purposes and a non-operative condition at which the hingedly-secured wheels are positioned so as to permit the second support surface end to be raised and lowered between the elevated condition and a lowered condition at which the support surface forms a ramp. The lever member is pivotally attached to the platform for manually raising and lowering the second support surface end between the elevated condition and the lowered condition.

18 Claims, 12 Drawing Figures

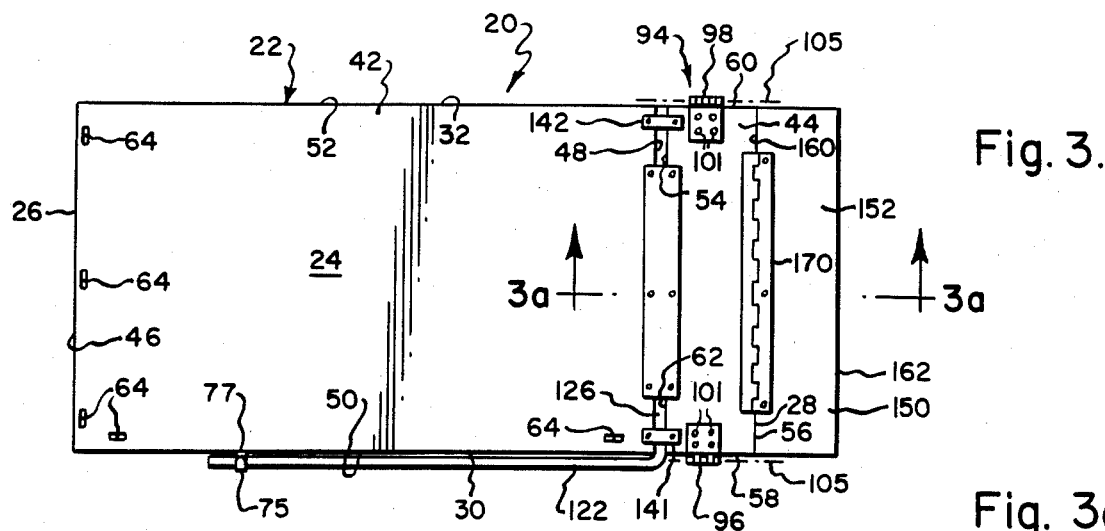
Fig. 3.
Fig. 3a.
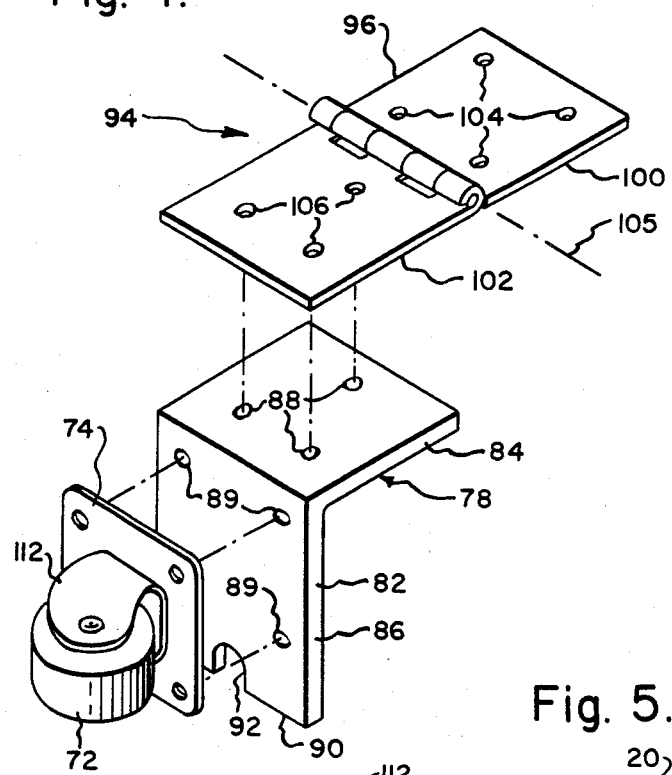
Fig. 4.
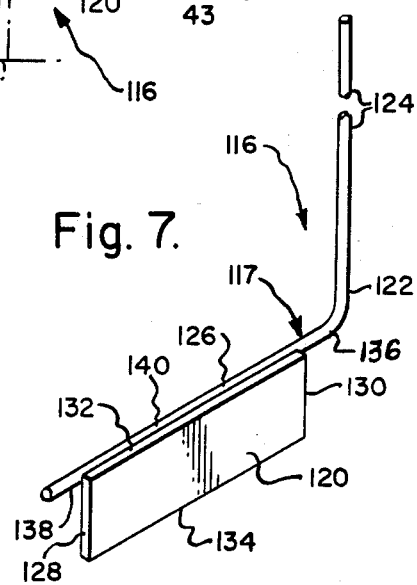
Fig. 7.
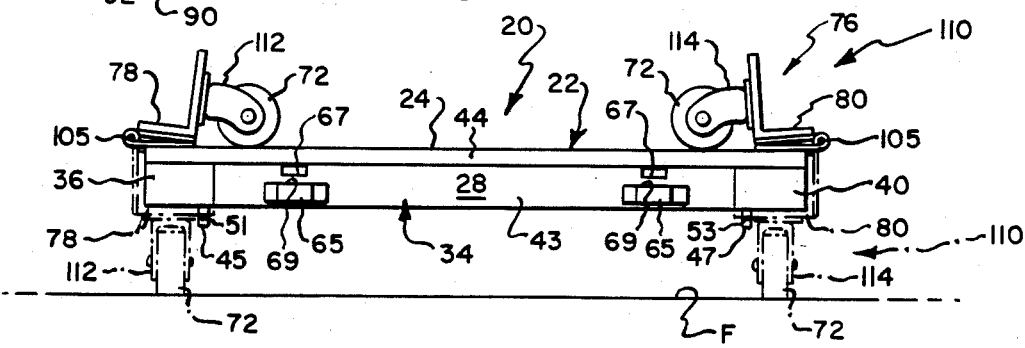
Fig. 5.

4,669,944

WHEELED TRUCK

BACKGROUND OF THE INVENTION

The present invention relates generally to wheeled trucks for transporting objects and relates, more particularly, to a wheeled truck facilitating the loading and unloading of objects thereon.

The type of truck with which this invention is to be compared includes a relatively low platform defining a support surface supported by a plurality of wheels in spaced relationship with an underlying floor. Such a truck commonly requires that an object desired to be moved be lifted upon or from the support surface during a loading or unloading operation. If the object to be moved is relatively heavy, the truck can be awkward to load or unload.

Accordingly, it is an object of the present invention to provide a new and improved wheeled truck facilitating the loading and unloading of objects thereon.

Another object of the present invention is to provide such a truck facilitating the loading and unloading of a relatively heavy, wheeled object such as an upright piano.

Still another object of the present invention is to provide such a truck having a support platform which is movable between an operative condition for transporting an object and a loading/unloading condition at which the platform provides a ramp for purposes of loading or unloading the truck.

Yet still another object of the present invention is to provide such a truck which is economical to manufacture and effective in operation.

A further object of the present invention is to provide such a truck which is safe and easy to use.

SUMMARY OF THE INVENTION ·

The present invention resides in a wheeled truck facilitating the loading and unloading of objects, such as upright pianos or other heavy wheeled objects, thereon.

The truck includes means defining an elongated support surface, first wheel means, second wheel means, and leverage means. The elongated support surface has first and second opposite ends, and the first wheel means are attached to the surface-defining means for supporting the first end of the support surface in an elevated relationship with an underlying floor. The second wheel means are connected to the surface-defining means for pivotal movement relative thereto between an operative condition at which the second wheel means operatively support the second end of the support surface in an elevated condition for transporting purposes and a non-operative condition at which the second wheel means permit the second support surface end to be raised and lowered between the elevated condition and a lowered condition at which the support surface forms a ramp. The leverage means are pivotally attached to the surface means for raising and lowering the second support surface end between a raised condition at which the second wheel means, when in the operative condition, are relieved of the weight of the second end of the support surface and the lowered condition.

To move the second support surface end from the elevated condition at which the second wheel means operatively support the second support surface end to the lowered, ramp-forming, condition, the leverage means are initially pivoted relative to the surface-defining means in an appropriate direction to a raised condition at which the second wheel means are relieved of the weight of the second support surface end. At that point, the second wheel means are pivoted to the non-operative condition, and the leverage means are pivoted relative to the surface-defining means to lower the second support surface end to the lowered condition.

To return the second support surface end from the lowered condition to the elevated condition for transporting purposes, the leverage means are initially pivoted relative to the surface-defining means to raise the second support surface end to a raised condition at which the second wheel means are returned to the operative condition. The second support surface end is subsequently lowered, by means of the leverage means, to place the weight of the second support surface end upon the second wheel means.

BRIEF DESCRIPTION OF THE DRAWING FIGURES

FIG. 3 is a plan view of the FIG. 1 embodiment as seen from above in FIG. 1 shown with its ramp extension in a ramp-forming position.

FIG. 3a is a cross-sectional view taken about on line 3a—3a of FIG. 3.

FIG. 4 is an exploded perspective view of a portion of the FIG. 1 embodiment drawn to a slightly larger scale.

FIG. 5 is an elevation view of the FIG. 1 embodiment as seen from the front in FIG. 1 and shown with its ramp extension removed.

FIG. 7 is a perspective view of the leverage means of the FIG. 1 embodiment.

DETAILED DESCRIPTION OF ILLUSTRATIVE EMBODIMENTS

Figure 1:
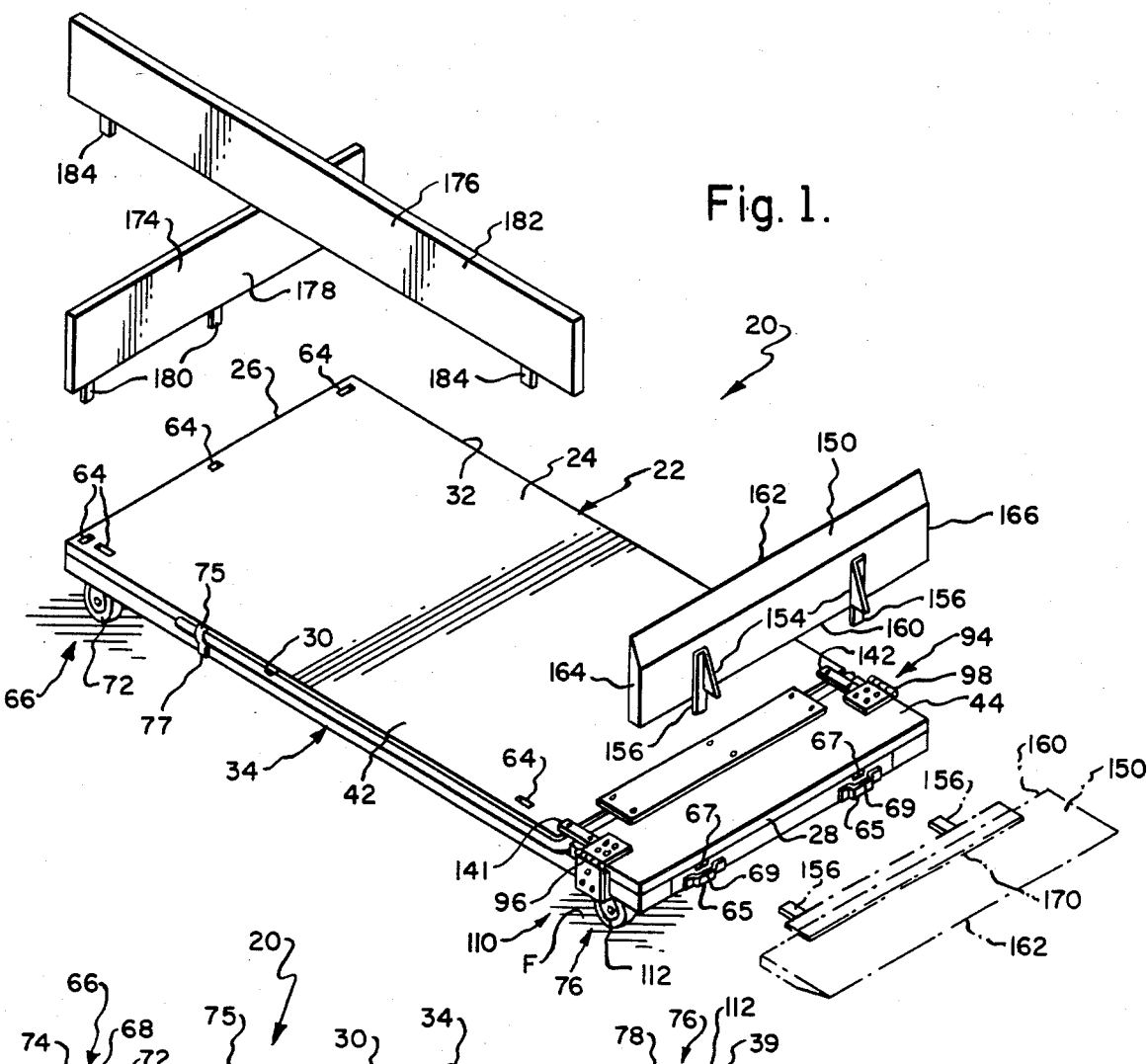
FIG. 1 is a perspective view of an embodiment of a truck in accordance with the present invention shown with its ramp extension in a stored position.

Turning now to the drawings in greater detail and considering first FIG. 1, there is shown a wheeled truck, generally indicated 20 and in accordance with the present invention, shown positioned upon a floor F. The truck 20 includes means, generally indicated 22, in the form of a platform defining a relatively low support surface 24 on which objects are placed for transport across the floor F. The support surface 24 is generally elongated and planar in shape and defines two opposite ends 26,28 and two opposite sides 30,32. As will be described in greater detail hereinafter, the end 28 of the platform 22 is movable toward and away from the floor F for movement of the support surface 24 between an elevated condition, as shown in FIG. 1, for transporting purposes and a lowered condition at which the support surface 24 forms a ramp facilitating loading and unloading of the truck 20.

With reference to FIGS. 2-5, the platform 22 includes a frame 34 comprised of four rigid frame members 36,38,40,43 arranged so as to form a rectangular-shaped frame. The frame members 36,38,40 and 43 are constructed of a suitable material, such as wood, and are of sufficient strength to provide a stable frame for the support surface 24. The frame members 36 and 40 include ends 39 and 41, respectively, arranged at the front of the platform 22 and each defining an aperture through which is fixedly received the shank of a bolt 45 or 47. As best shown in FIG. 5, each bolt 45 or 47 has an end which extends away, or downwardly, from the corresponding frame member 36 or 40 and is apertured for receiving a removable spring-locking pin 51 or 53.

The platform 22 further includes two rectangular sheets 42,44 of rigid material, such as plywood, attached to the frame 34. As best shown in FIG. 3, the sheet 42 has two opposite and parallel ends 46,48 and two opposite and parallel sides 50,52 and is attached atop the frame 34 so that the frame member 38 extends along the sheet end 46 and the frame members 36,40 extend for a substantial distance along the sheet sides 50,52, respectively, as measured from the sheet end 46. The sheet 44 has two opposite and parallel ends 54 and 56 and two opposite and parallel sides 58,60. The sheet 44 is attached atop the frame 34 so that the sheet end 56 extends along the frame member 43 and the sheet sides 58 and 60 extend for a relatively short distance along the length of the frame members 38,40, respectively, as measured from the frame member ends 39,41. Furthermore, the sheet ends 48 and 54 are spaced apart so as to form a narrow gap 62 therebetween.

With reference to FIG. 3, the sheets 42 and 44 define generally upwardly-directed surfaces which collectively provide the generally planar support surface 24. Thus, the end 46 of the sheet 42 provides one, or the first, the one or the first end 26 of the support surface 24, and the end 56 of the sheet 44 provides the other, or the second, end 28 of the support surface 24. Defined in the support surface 24 along the end 26 and side 30 for a reason which will be apparent hereinafter are rows of apertures 64. As best shown in FIG. 5, the frame member 43 defines two notches which provide with the sheet 44 two apertures 67,67. Furthermore and referring still to FIG. 5, the truck 20 includes coupling members 65,65 which are attached to one side of the frame member 38 and generally beneath the apertures 67,67. Each coupling member 65 defines with the frame member 38 coupling openings 69,69 opening in a direction generally perpendicular to the support surface 24. Still further and with reference again to FIG. 3, a hook 75 is attached by means of a short chain 77 to the platform 22 adjacent the support surface side 30.

Figure 2:
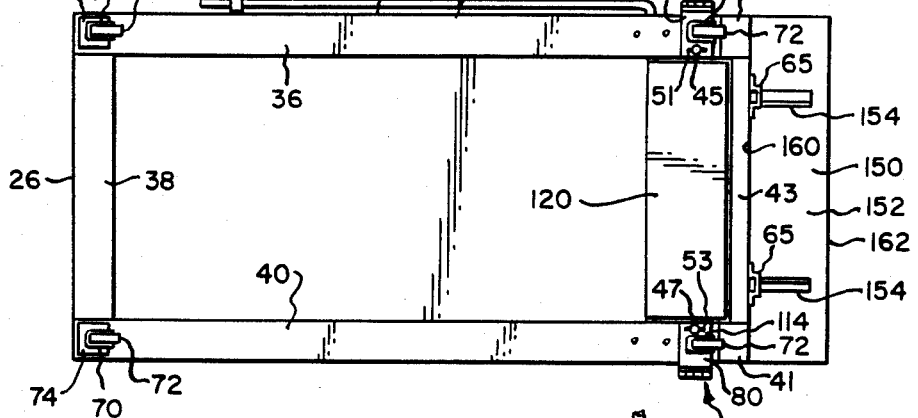
FIG. 2 is a plan view of the FIG. 1 embodiment as seen from below in FIG. 1 shown with its ramp extension in a ramp-forming position.

With reference again to FIGS. 1 and 2, the truck 20 includes a first wheel means, generally indicated 66 attached to the platform 22 for supporting the first end 26 of the support surface in an elevated relationship with respect to the floor F. As best shown in FIG. 2, the first wheel means 66 include a pair of casters 68,70 attached to the frame 34. Each caster 68 or 70 includes a wheel 72 and a holding portion 74 joined together in a manner well-known in the art to permit the rotation of the wheel 72 relative to the holding portion 74 about a rotational axis and pivotal movement of the wheel 72 about a pivot axis oriented generally perpendicular to the rotational axis. The holding portion 74 of one caster 68 is securely bolted to the frame member 36 adjacent the support surface end 26 and the holding portion of the other caster 70 is securely bolted to the frame member 40 adjacent the support surface end 26.

With reference to FIGS. 2 and 4-6, the truck 20 includes wheel-mounting means, generally indicated 76, hingedly secured to the platform 22 adjacent the end 28 of the support surface 24. The wheel-mounting means 76 includes two metal bodies 78,80 each hingedly secured to the platform 22 adjacent a corresponding one of the sides 30,32 of the support surface 24. As exemplified by the body 78 of FIG. 4, each body 78 or 80 is in the form of a L-shaped angle 82 having two legs 84, 86. Each leg 84 or 86 is generally planar in shape with a plurality of holes 88 or 89 as shown. Furthermore, the leg 86 has one edge, indicated 90, along which is defined an arcuate notch 92 as shown.

The truck 20 further includes means, indicated 94, for hingedly securing each body 78 or 80 of the wheel-mounting means 76 to the platform 22. The securing means 94 is in the form of two hinges 96,98 which, as exemplified by the hinge 96 of FIG. 4, each hinge 96 or 98 includes two platen members 100,102 hinged for movement about a pivot axis 105. The platen member 100 of each hinge 96 or 98 includes a series of mounting holes 104 and the platen member 102 includes a series of mounting holes 106. As shown in FIG. 3, the platen member 100 of each hinge 96 or 98 is fixedly secured with screws 101 to a corresponding side of the support surface 24 and adjacent the support surface end 28 so that the pivot axis 105 of each hinge 96 or 98 is arranged generally parallel to and offset to one side of the support surface 24. More specifically, the screws 101 extend through the mounting holes 104 in the platen member 100 and into the sheet 44 to hold the platen member 100 between the sheet 44 and the heads of the screws.

With reference again to FIG. 4, each plate member 102 of the hinge 96 or 98 is attached to a leg 84 of a corresponding body 78 or 80. More specifically, the mounting holes 106 are aligned with the mounting holes 88 of a leg 84 and are attached together with bolts (not shown) extending therethrough.

With reference to FIG. 5, the hinges 96,98 thus permit the bodies 78 and 80 of the wheel-mounting means 76 to pivot about the pivot axes of the hinges 96,98 between a first or aperture position, as shown in phantom, at which the angle of each body 78 or 80 effectively wraps about the side and underside of a corresponding one of the frame members 36 or 40 or a second position, as shown in solid lines at which the leg 84 of each angle body 78 or 80 overlies the support surface 24.

As shown in FIGS. 2 and 5, the truck 20 further includes means for releasably securing the bodies 78 and 80 in the aforesaid first position. The means for releasably securing include the two bolts 45,47, introduced earlier, and the spring pins 51,53. The bodies 78 and 80 are so connected to the platform 22 that when the spring pins 51,53 are removed from the bolts 45,47 and the bodies 78 and 80 are moved from the second position to the first, each bolt 45 or 47 is accepted by the notch 92 in a corresponding body 78 or 80. Insertion of the removable spring pins 51,53 into the ends of the bolts 45,47 when the bodies 78,80 are positioned in the aforesaid first position releasably secures each body leg 82 or 82 between a spring pin 51 or 53 and a corresponding frame member 36 or 40.

With reference to FIGS. 1,2,5 and 6, the truck 20 further includes second wheel means, indicated 110, attached to the bodies 78 and 80 of the wheel-mounting means 76. The second wheel means 110 are in the form of two casters 112,114 which each include a wheel 72 and a holding portion 74 as do the casters 68,70 previously described. As best shown in FIG. 4, the holding portion 74 of each caster 112 or 114 is positioned against the leg 86 of a corresponding body 78 or 80 and is fixedly secured thereto by bolts (not shown) which extend through the caster holding portion 74 and the leg mounting holes 89.

With reference to FIG. 5, it will be understood from the above that when each body 78 and 80 of the wheel-mounting means 76 is positioned in the aforedescribed first position as shown in phantom, the casters 112,114 are positioned in an operative condition for supporting the end 28 of the support surface 24 in an elevated condition for transporting purposes, and when each body 78 or 80 is positioned in the aforesaid second condition as shown in solid lines, the casters 112,114 are positioned in a non-operative or stored condition to permit the lowering of the support surface end 28 to the floor F.

Figure 6:
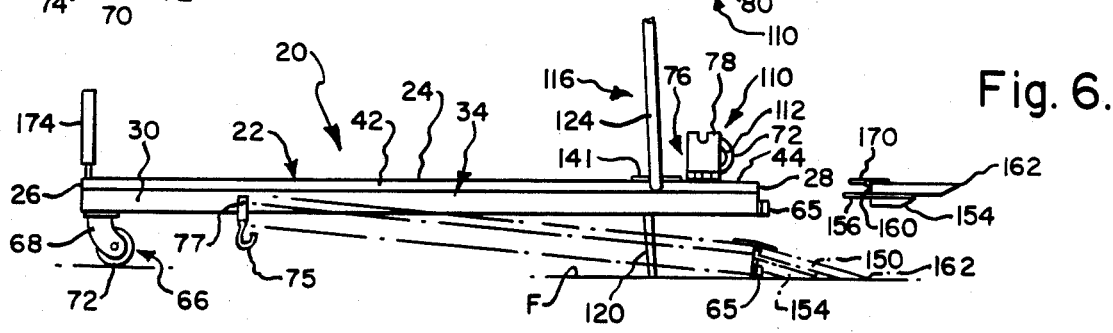
FIG. 6 is an elevation view of the FIG. 1 embodiment as generally seen from the left in FIG. 1.
Figure 8:
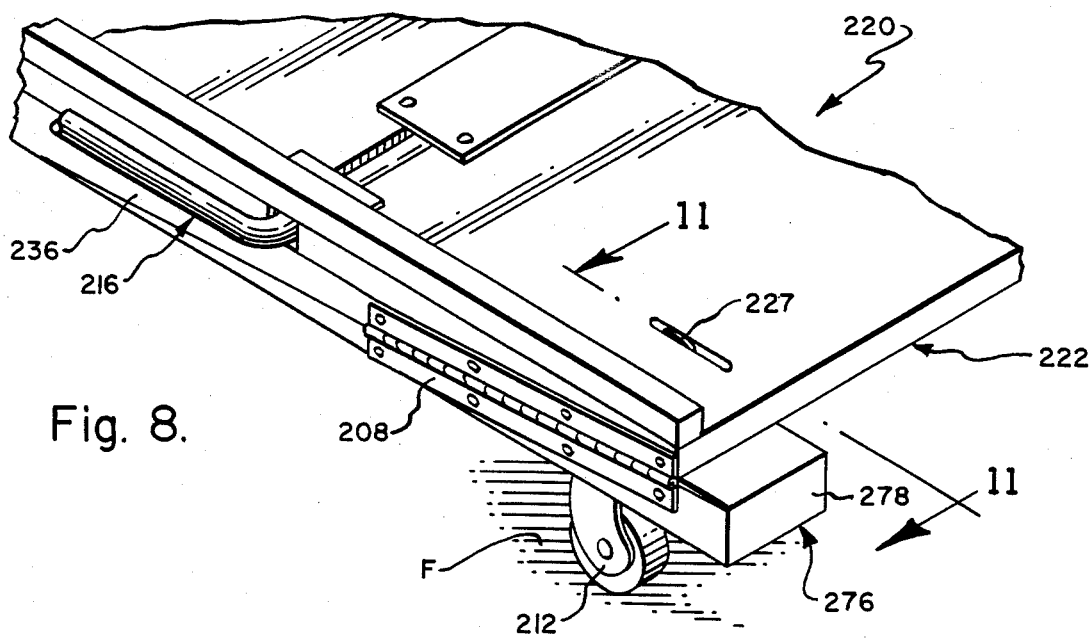
FIG. 8 is a fragmentary perspective view of another embodiment of a truck in accordance with the present invention.

With reference to FIGS. 1, 6 and 7, the truck 20 further includes leverage means 116 including a lever member 117 attached to the platform 22 for raising and lowering the end 28 of the support surface 24. As best shown in FIG. 7, the leverage means 116 is comprised of a L-shaped metal bar 122 having one leg 124 and another leg 126 and an elongated metal plate 120 defining two opposite and parallel sides 128,130 and two opposite and parallel edges 132,134. One leg 126 of the bar 122 defines two end portions 136,138 and a mid-portion 140 defined between the end portions 136 and 138. The edge 132 of the plate 120 is fixedly secured, as by welding, to the mid-portion 140 of the bar leg 126 so that the plate 120 is substantially parallel to the plane defined by the legs 124 and 126 of the bar 122. For a reason which will be apparent hereinafter, the length of the plate sides 128 and 130 are slightly longer than the distance at which the casters 112,114 operatively support the support surface end 28 above the floor F.

The leverage means 116 is pivotally connected to the platform 22 so that the bar leg 124 and plate 120 pivot generally about an axis extending transversely of the support surface 24. More specifically, the bar leg 126 is positioned within the gap 62 defined between the spaced edges 48 and 54 of the sheets 42 and 44 so that each end portion 136 or 138 rests upon the corresponding frame member 36 or 40 and the attached plate 120 is positioned generally between the frame members 36 and 40 and beneath the support surface 24. As best shown in FIG. 3, elongated plate members 141,142 are positioned across the end portions 136 and 138 of the bar leg 126 and fixedly secured to the sheets 42 and 44 and frame members 36 and 40 with bolts to retain the end portions 136 and 138, and thus the bar leg 126, within the gap 62. It will be understood that although confined within the gap 62, the bar leg 126 is permitted to rotate therein about its longitudinal axis. Thus, the bar leg 124 and plate 120 can be pivoted relative to the surface-defining means 24 about a pivot axis oriented generally parallel to the support surface 24 and the support surface ends 26 and 28.

As best shown in FIG. 6, the leverage means 116 can be pivoted relative to the platform 22 to a stowed condition along the support surface side 30 so that the plane defined by the bar legs 124,126 is arranged generally parallel to the support surface 24. Furthermore, the leverage means 116 can be releasably secured in the aforesaid stowed condition by means of the hook 75 placed over the bar leg 124. It will be understood that when the casters 112,114 are positioned in the operative condition for supporting the support surface 24 in parallel relationship with the floor F and the leverage means 116 is positioned in the stowed condition, the plate edge 134 is elevated from the floor F so as not to interfere with the movement of the truck 20 across the floor F.

The leverage means 116 permits the support surface end 28 to be manually moved between an elevated, transporting condition as shown in FIG. 1 to a ramp-forming condition, as shown in phantom lines in FIG. 7. In order to move the support surface end 28 from the transporting condition to the ramp-forming condition, the bar leg 124 is manually pivoted from its stowed condition in a clockwise direction as viewed in FIG. 6 so that the plate edge 134 pivots from its elevated condition to a condition at which the plate edge 134 engages the floor F and the plate 120 is oriented substantially vertically. Since the plate sides 128,130 are slightly longer than the distance between the support surface 24 and the bottom of the casters 112,114 when in the operative condition, the plate 120 acts between the floor F and the platform 22 to raise the support surface end 28 to a raised condition so that the weight of the support surface end 28 is relieved from the casters 112,114 and the casters 112,114 are spaced a short distance from the floor F. It will be understood that the support surface end 28 is positioned slightly higher in the aforesaid raised condition than in the aforesaid elevated, transporting condition. At that point, the spring pins 51,53 are removed and the bodies 78,80 of the wheel-mounting means 76 are pivoted to the FIG. 5 solid line position so that the casters 112,114 are positioned in a non-operative, out-of-the-way condition. The bar leg 124 is subsequentially pivoted in a counterclockwise direction as viewed in FIG. 7 toward the stowed condition to lower the support surface end 28 so that the frame member 43 engages the floor F and the support surface end 28 is positioned relatively close to the floor F. The leverage means 116 can thereafter be stowed by means of the hook 75. It follows that with the support surface end 26 maintained in its normal, elevated condition and the support surface end 28 positioned in a lowered condition, the support surface 24 provides a ramp facilitating loading and unloading of the support surface 24 of the truck 20.

With reference to FIGS. 1-3 and 6, the truck 20 further includes means providing a ramp extension 150 for providing an incline between the floor F and the support surface end 28. The ramp extension 150 is comprised of a wedge-shaped body 152 constructed, for example, of wood and two modified steel angle pieces 154,154 attached to one side of the extension body 152. The extension body 152 has a thick edge 160, a thin edge 162 which is opposite and parallel to the thick edge 160 and two opposite and parallel sides 164,166. The angle pieces 154,154 are arranged generally parallel to one another and include single-leg end portions 156,156 which extend from the thick edge 160 of the extension body 152. A piano hinge 170 is secured to one side of the extension body 152 opposite the studs 154,154 and adjacent the thick edge 160 for a reason hereinafter apparent.

The angle end portions 156,156 are adapted to be slidably and removably inserted in the notch apertures 67,67 of the surface-defining means 22 so that the extension body edge 160 abuts the support surface end and to thereby connect the ramp extension 150 to the platform 22. With the ramp extension 150 and platform 22 being connected as aforesaid and the support-surface end 28 being positioned in its lowered condition, the ramp extension 150 provides an uninterrupted incline from the floor F to the support surface end 28. Thus, the ramp extension 150 facilitates the rolling of wheeled objects onto and off of the support surface 24 during a loading or unloading operation of the truck 20. The piano hinge 170 spans the crack defined between the ramp body 152 and the platform 24 to provide a bridge thereacross.

In order to raise the support surface end 28 from the lowered loading/unloading condition to an elevated condition for transporting purposes, the bar leg 124 is manually pivoted from its stowed position in a clockwise direction as viewed in FIG. 6 so that the plate 120 acts between the floor F and surface-defining means 22 to raise the support surface end 28 to a raised condition at which the casters 112,114 can be returned to the operative or FIG. 5 phantom line position. Once the bar leg 124 is positioned so that the plate portion 120 is oriented substantially vertically, the bodies 78,80 of the wheel-mounting means 76 are pivoted to move the casters 112,114 to the operative condition. The spring pins 51,53 are then inserted within the bolts 45,47 to secure the casters 112,114 in the operative condition. The bar leg 124 is subsequentially pivoted in a counter-clockwise direction as viewed in FIG. 7 to lower the casters 112,114 to the floor F and move the leverage means 116 to its stowed condition for securement with the hook 75.

The leverage means 116 includes an effort portion and a response portion, and it follows from the above that the effort portion includes the bar leg 124 and the response portion includes the plate 120.

The angle end portions 156,156 of the ramp extension 150 are adapted to be slidably and removably received by, in addition to the notch openings 67,67, the couplings apertures 69,69. With the end portions 156,156 being inserted in the coupling apertures 69,69, the extension body 152 provides an end stop at the support surface end 28. Such an end stop is advantageous in that it effectively prevents objects loaded on the truck 20 from falling or rolling off the support surface end 28. Thus, it will be understood that the ramp extension 150 can be selectively attached to the platform for use as an incline or an end stop.

With reference again to FIG. 1. there are shown additional stop means in the form of a wooden end stop 174 and a wooden side stop 176. The end stop 174 includes a plank 178 and studs 180,180 attached to the plank 178 so as to extend from one edge thereof. The studs 180,180 are adapted to be slidably and removably received by the apertures 64,64 defined along the support surface end 26 to thereby removably retain the plank 178 in a substantially upright position. The side stop 176 includes a plank 182 and studs 184,184 attached to the plank 182 so as to extend from one edge thereof. The studs 184,184 are adapted to be slidably and removably received by the apertures 64,64 defined along the support surface side 30.

Figure 9:
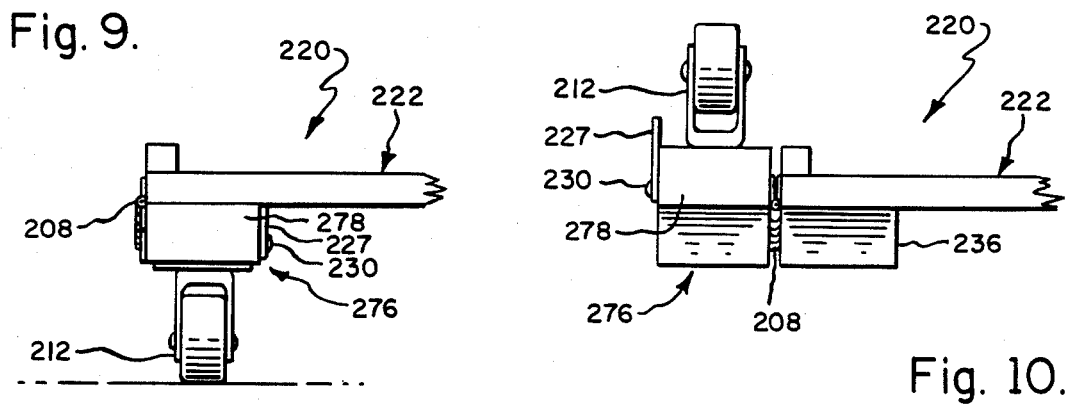
FIG. 9 is a fragmentary elevation view of the FIG. 8 embodiment as seen from the front in FIG. 8.
Figure 10:
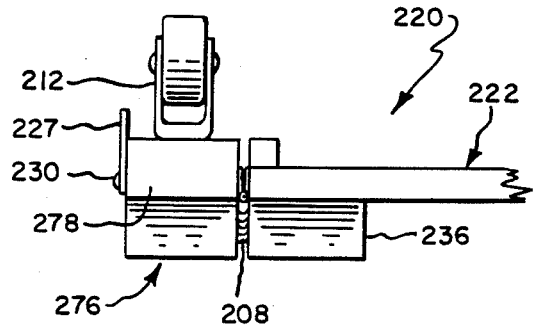
FIG. 10 is a view similar to FIG. 9 illustrating a truck wheel when positioned in a non-operative condition.
Figure 11:
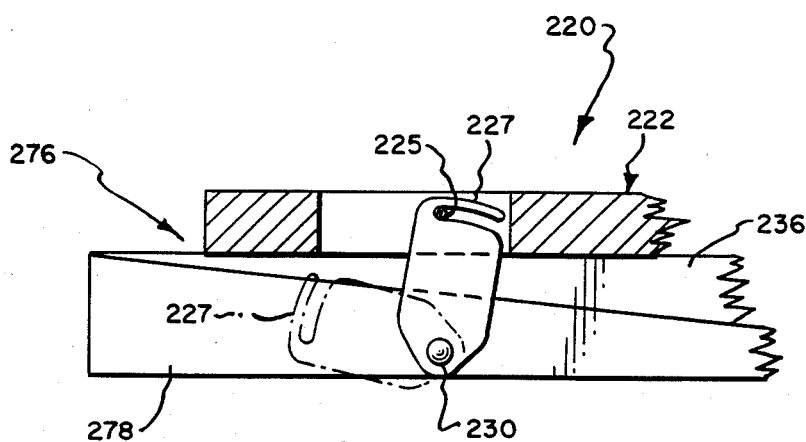
FIG. 11 is a cross-sectional view taken about on FIG. 11—11 of FIG. 8.

It will be understood that numerous modifications and substitutions can be made to the aforedescribed embodiment without departing from the spirit of the invention. For example, although the wheel-mounting means 76 of the truck 20 has been shown and described as being in the form of two bodies 78,80, each having an L-shaped cross-section, the shape of the wheel-mounting means is not necessarily so limited. For example, there is shown FIGS. 9–11 a truck 220 including a platform 222 and wheel-mounting means 276 in the form of a block shaped body 278 (only one shown). The platform 222 includes a frame member 236, and the body 278 is hingedly secured to the frame member 236 by means of a hinge 208. A caster, indicated 212, is thereby permitted to be pivotally moved from an operative condition, as shown FIG. 9, to a non-operative condition as shown in FIG. 10. The caster 212 is securable in its operative condition by means of a rod 225 embedded in the platform 222 as shown in FIG. 11 and a cooperating hook member 227 pivotally attached to the body 278 by means of a pin 230. Accordingly, the aforedescribed embodiment is intended for illustration and not as limitation.

I claim:
1. A wheeled truck comprising:
   means defining a support surface having first and second opposite ends and two opposite sides extending between said first and second opposite ends,
   first wheel means attached to said surface-defining means for constantly supporting said first end of said support surface in an elevated condition, said first wheel means being positioned adjacent said first end of said support surface and adjacent said two opposite sides so as to resist tipping of said surface-defining means to one side thereof;
   second wheel means including a pair of wheels each being hingedly secured to said surface-defining means adjacent a corresponding one of said two opposite sides of said support surface and positioned adjacent said second end of said support surface for pivotal movement relative thereto between an operative condition at which said second wheel means can operatively support said second end of said support surface in an elevated condition for transporting purposes and a non-operative condition at which said second wheel means permit said second support surface end to be raised and lowered between said elevated condition and a lowered condition at which said support surface forms a ramp, said second wheel means being positioned generally beneath said support surface when positioned in the operative position and positioned generally out from beneath said support surface when positioned in the non-operative condition so that said second end of said support surface can be lowered from said elevated condition to the lowered condition through substantially the entire space occupied by said second wheel means when positioned in the operative position; and
   leverage means attached to said surface-defining means for raising and lowering said second support surface end between a raised condition at which said second wheel means, when in said operative condition, is relieved of the weight of said second support surface end and said wheels of said second wheel means can be pivotally moved from said operative condition to said non-operative condition and said lowered condition.

2. A truck as defined in claim 1 wherein said support surface is generally planar.

3. A truck as defined in claim 1 wherein said first wheel means include a pair of swivel casters.

4. A truck as defined in claim 1 wherein each wheel of said pair of wheels is provided by a swivel caster.

5. A truck as defined in claim 1 wherein said leverage means is adapted to act between a floor and said surface-defining means for raising and lowering said second support surface end.

6. A truck as defined in claim 5 wherein said leverage means is pivotally connected to said surface-defining means for movement about a pivot axis, said leverage means has an effort portion extending to one side of said pivot axis and a response portion extending to one side of said pivot axis and a response portion extending to another side of said pivot axis and positioned inboard of the sides of said supporting surface, said effort portion is manually movable relative to said surface-defining means between two pivotal positions to pivotally move said response portion to raise and lower said second support surface end.

7. A truck as defined in claim 6 wherein said leverage means is hingedly joined to said surface-defining means so that said pivot axis is oriented generally perpendicular to the longitudinal axis of said support surface and said surface-defining means includes means for nestingly receiving said response portion for purposes of stowing said response position in an unobstructive, out-of-the way-condition.

8. A truck as defined in claim 6 wherein said leverage means includes a rod member arranged transversely of said support surface and journalably connected to said surface-defining means so that the longitudinal axis of said rod member coincides with said pivot axis and said response portion is in the form of a plate extending transversely of said support surface and rigidly joined to said rod member along the length thereof for acting between said surface-defining means and an underlying floor to raise and lower said second support surface as said effort portion is moved between said two pivotal positions.

9. A truck as defined in claim 8 wherein said effort portion is in the form of a bar having one end joined to one edge of said plate and arranged substantially in the plane of said plate.

10. A truck as defined in claim 6 wherein said pivot axis is oriented relatively close to said second support surface end.

11. A truck as defined in claim 1 wherein said other support surface end is spaced a relatively short distance from the underlying floor when in said lowered condition and said truck further comprises:
means defining a ramp extension secured to said surface-defining means adjacent said second support surface end for providing an incline oriented generally downwardly from said second support surface end to the floor when said second support surface end is positioned in said lowered position.

12. A truck as defined in claim 11 wherein said means defining a ramp extension is removably secured to said surface-defining means.

13. A truck as defined in claim 1 further comprising end stop means secured to said surface-defining means adjacent one of the first and second ends of said support surface.

14. A truck as defined in claim 1 further comprising side stop means secured to said surface-defining means so as to extend generally between said ends of said support surface.

15. A wheeled truck comprising:
means defining an elongated support surface having first and second opposite ends and two opposite sides extending between said first and second opposite ends;
first wheel means attached to said surface-defining means for continually maintaining said first end of said support surface in elevated relationship with a floor, said first wheel means positioned adjacent said first end of said support surface and adjacent each of said two opposite sides so as to resist tipping of said surface-defining means to one side thereof;
second wheel means including a pair of wheels;
means hingedly of securing each wheel said second wheel means to said surface-defining means adjacent said second end of said support surface and adjacent a corresponding one of said two opposite sides for pivotal movement of each wheel of said second wheel means relative to said surface-defining means between an operative condition at which said second wheel means can operatively support said second end of said support surface in an elevated condition for transporting purposes and a non-operative condition at which said second wheel means permit said second support surface end to be raised and lowered between said elevated condition and a lowered condition at which said support surface forms a ramp, said second wheel being positioned generally beneath said support surface when positioned in the operative position and positioned generally out from beneath said support surface when positioned in the non-operative condition so that said second end of said support surface can be lowered from the elevated condition to the lowered condition through substantially the entire space occupied by said second wheel means when positioned in the operative position; and
leverage means attached to said surface-defining means for raising and lowering said second support surface end between a raised condition at which said second wheel means is relieved of the weight of said second support surface end when said second wheel means are in said operative condition so as to permit each wheel of said second wheel means to be pivotally moved from said operative condition to said non-operative condition and said lowered condition.

16. A truck as defined in claim 15 wherein said means for hingedly securing includes two bodies, each wheel of said second wheel means being attached to a corresponding one of said two bodies, each of said bodies being hingedly secured to said surface-defining means adjacent a corresponding one of said two opposite sides of said support surface for pivotal movement of said two wheels between said operative condition and said non-operative condition.

17. In a wheeled truck having means defining an elongated support surface having two opposite ends, two opposite sides extending between said opposite ends and two wheels attached to the surface-defining means at each end of the support surface, the improvement comprising:
means hingedly securing the wheels located at one end of the support surface to said surface-defining means for pivotal movement of said hingedly-secured wheels relative to said surface-defining means between an operative condition at which said hingedly-secured wheels operatively support said one surface end in an elevated condition for transporting purposes and a non-operative condition to permit said one support surface end to be raised and lowered between said elevated condition and a lowered condition at which said support surface forms a ramp, said hingedly-secured wheels being positioned generally beneath said support surface when positioned in the operative position and positioned generally out from beneath said support surface when positioned in the non-operative condition so that said one support surface end can be lowered from said elevated condition to said lowered condition through substantially the entire space occupied by the hingedly-secured wheels when positioned in the operative condition; and leverage means attached to said surface-defining means for raising and lowering said one support surface end between a raised condition at which said hingedly-secured wheels, when in said operative condition, are relieved of the weight of said one support surface end so as to be pivotally movable from said operative condition to said non-opeative condition and said lowered condition.

18. The improvement of claim 17 wherein said leverage means is pivotally connected to said surface-defining means for movement about a pivot axis oriented transversely of the support surface and relatively close to said one support surface end.

* * * * *